May 10, 1938. A. A. GOULD 2,116,757
ATTACHMENT FOR MOTOR VEHICLES
Filed Oct. 10, 1932 2 Sheets-Sheet 1
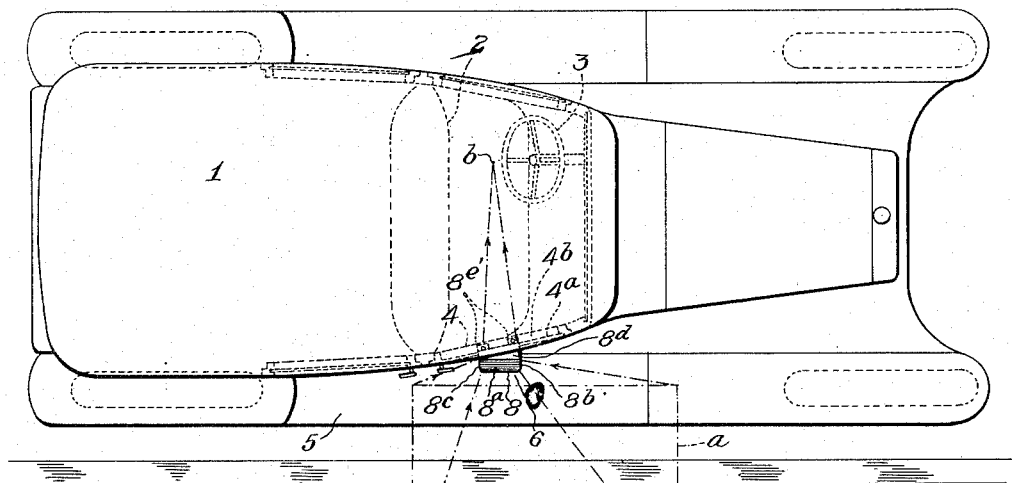
FIG. 1.
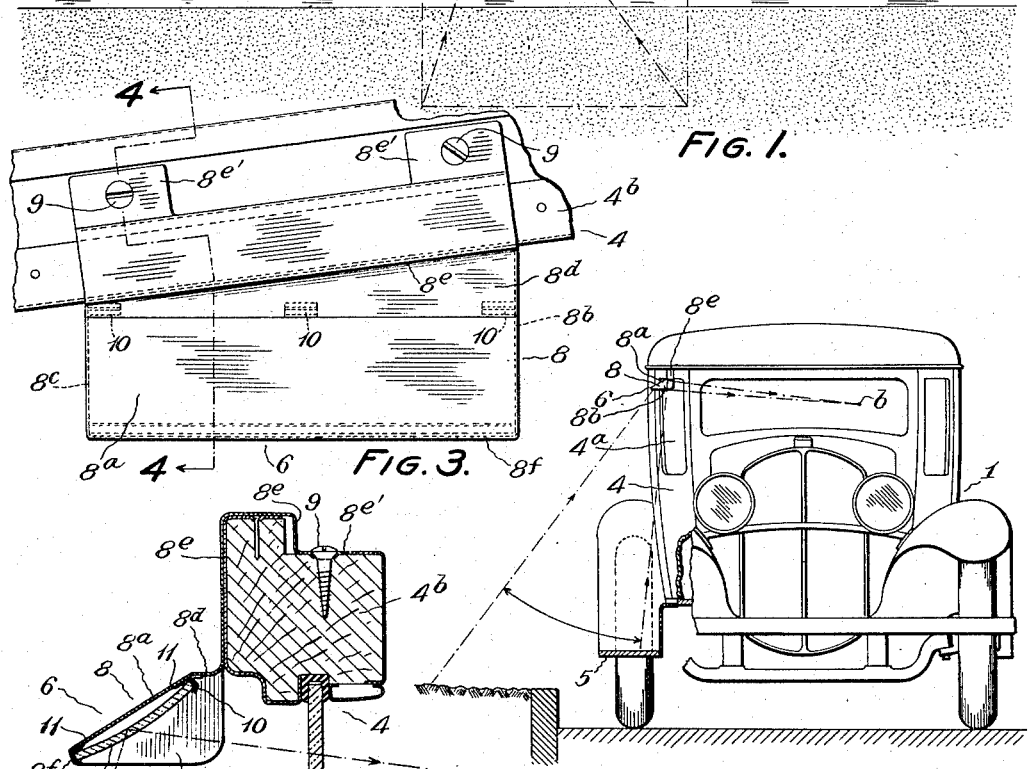
FIG. 3.
FIG. 2.
FIG. 4.
INVENTOR:
Allen A. Gould
BY Ray A. Gehr
ATTORNEY May 10, 1938.  A. A. GOULD  2,116,757

ATTACHMENT FOR MOTOR VEHICLES

Filed Oct. 10, 1932  2 Sheets-Sheet 2

INVENTOR:
Allen A. Gould
BY Ray S. Fehr
ATTORNEY

Patented May 10, 1938

2,116,757

UNITED STATES PATENT OFFICE 2,116,757

ATTACHMENT FOR MOTOR VEHICLES

Allen A. Gould, Cleveland, Ohio

Application October 10, 1932, Serial No. 637,017

7 Claims. (Cl. 88—86)

The invention relates to a vision attachment for motor vehicles adapted to facilitate the parking of such vehicles adjacent street curbs or other objects.

One object of the invention is to provide a mirror attachment or fitting for motor vehicles which is adapted, independently of other mirror attachments of the vehicle, to enable the driver, without turning his body from the normal driving position, to see an image of the running board and the adjacent ground surface, thus greatly facilitating the parking of such vehicle adjacent street curbs or other vehicles or objects.

A further object of the invention is to provide a mirror fitting of the character referred to which is adapted to be readily attached to vehicles of widely varying body designs.

Other objects of the invention comprise the provision of a mirror attachment of the character referred to which is compact, pleasing in appearance, adapted to be fitted to the exterior of the vehicle body adjacent a window opening thereof without objectionably obstructing the window opening and which can be produced at low cost.

Other objects, more or less incidental or ancillary to those stated, and the manner of attaining the various objects will be apparent from the following description referring to the accompanying drawings which show preferred embodiments of the invention.

In the drawings, Fig. 1 is a plan view showing my improved attachment applied to a motor vehicle of conventional design and indicating the field of vision of the running board and adjacent ground surface which the attachment affords to the driver of the vehicle.

Fig. 2 is a front elevation of the same vehicle with my improved attachment applied thereto, the lateral extent of the field of view afforded by the attachment being indicated in this view also.

Fig. 3 is an enlarged plan view of the attachment and the adjacent top part of the vehicle door to which the attachment is secured.

Fig. 4 is a sectional view on the broken line 4—4 of Fig. 3.

Figure 5:
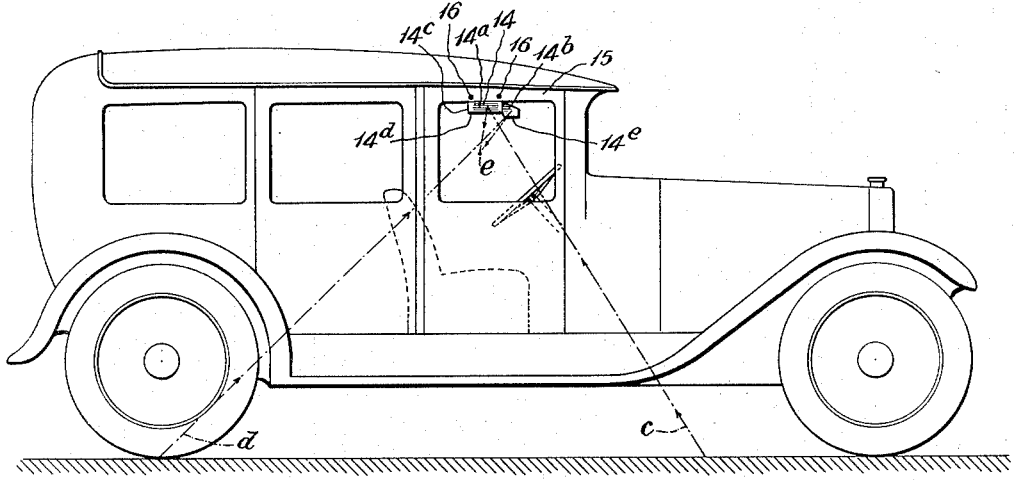
Fig. 5 is a side elevation of a motor vehicle with a modified form of my attachment applied thereto.
Figure 6:
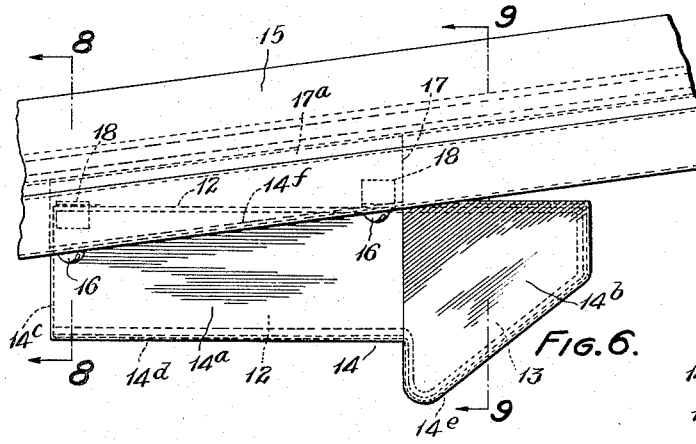
Fig. 6 is an enlarged plan view of the form of attachment shown in Fig. 5, together with an adjacent part of the door to which the attachment is secured.
Figure 8:
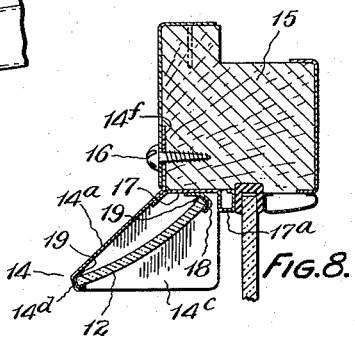
Fig. 8 is a section on the line 8—8 of Fig. 6.
Figures 7, 9:
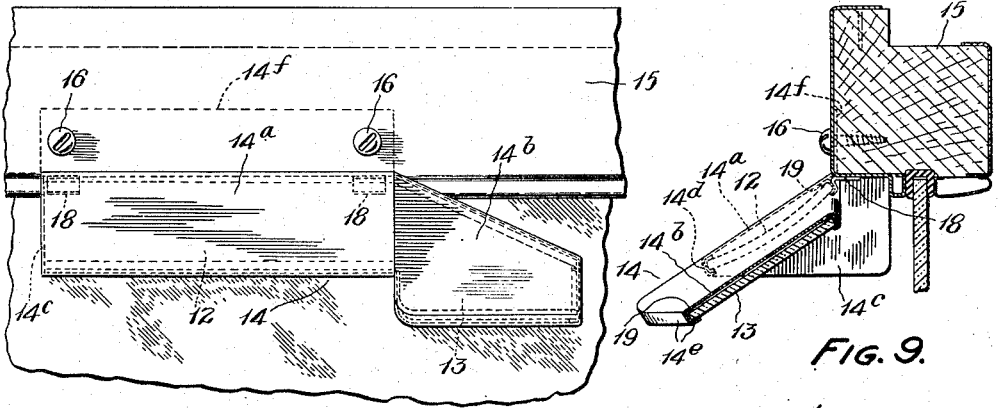
Fig. 7 is an enlarged side elevation of the parts shown in Fig. 6.
Fig. 9 is a section on the line 9—9 of Fig. 6.

Referring in detail to the constructions illustrated and first to that illustrated in Figs. 1 to 4, inclusive, I designates as an entirety the vehicle body which is of the conventional five passenger, four door type. 2 designates the front or driver's seat, 3 the steering wheel adapted, through the usual steering gear connection with the front wheels, to steer the vehicle and 4 the right front entrance door opposite the driver's seat, this door having the usual movable window pane $4^a$. 5 designates the right running board of the vehicle. All of these parts are of well known conventional construction, as are other parts (not shown) of the vehicle such as the steering gear connecting the steering wheel 3 with the front ground wheels, the engine and engine control devices.

My improved attachment, designated as an entirety by 6, comprises a glass mirror 7 which is preferably elongated on lines fore and aft of the vehicle and a supporting and housing structure for the mirror which is designated as an entirety by 8. This supporting and housing structure as shown is a sheet metal stamping having a downwardly and laterally inclined wall $8^a$ covering the back of the mirror and front and rear depending walls $8^b$, $8^c$ which, in conjunction with the wall $8^a$, constitute a protecting cover or hood for the mirror. The structure also comprises a horizontal inwardly extending wall $8^d$ which is of triangular outline as shown in Fig. 3, and an extension $8^e$ which projects upwardly from the hood portion of the structure and extends inwardly over the top member $4^b$ of the adjacent door, being bent to conform approximately to the top rabbeted contour of the top of said door. This part $8^e$ also comprises apertured flanges $8^{e'}$ which enable the attachment to be secured to the wood top member $4^b$ of the door by means of screws 9, 9.

The mirror 7 is preferably fixed in position in the supporting structure 8 by the depending wall or flange $8^f$, which embraces the lower outer edge of the mirror, and a plurality of clips or flanges 10 which are secured to the wall $8^a$ and embrace the upper inner edge of the mirror. The edges of the mirror are preferably protected by strips 11, 11 of fiber or other suitable material. The mirror is effectively held against endwise displacement and is fully protected at the ends by the end walls $8^b$ and $8^c$ of the supporting structure. The mirror 7 may be of plain form but I prefer to employ a mirror that is straight on fore and aft lines but convexly curved on transverse lines and this curvature is preferably cylindrical and therefore uniform. Preferably, also, as in the construction shown, the form and arrangement of the mirror is such that the intersection thereof with a vertical plane parallel to the outer edge of the running board is on a straight line parallel to said edge.

With the mirror constructed and mounted in the manner described, a person sitting behind the steering wheel in the driver's seat and with his body and limbs in normal driving position can, by glancing to the right, get a view in the mirror 7 of a considerable portion of the running board and adjacent parts of the surface of the ground. The field of vision of running board and ground thus afforded is indicated approximately in Fig. 1 by the dot-and-dash rectangle a, the rays of light from the bounds of this rectangle being indicated by the lines with arrows converging on the mirror 7 and, after reflection, converging to the region of point b which is intended to represent the approximate position of the eye of the driver. By making the mirror 7 of curved form, as shown in Fig. 4, the driver, with but slight raising or lowering of his head, is afforded a field of vision of running board and ground of considerable area.

The use of the attachment and its advantages will readily be understood and appreciated. In parking the vehicle the driver has but to turn his head sidewise and glance at the mirror 7 to be able, without bending or turning his body from the normal driving position, to secure a view of the outer side of the right running board and a considerable area of the adjacent part of the ground and thus, in moving the vehicle either forward or rearward to a position adjacent the street curb or to a position adjacent another vehicle or other object, the driver is enabled at all times to see the position of the vehicle in relation to the curb or other object and to manipulate the steering wheel from moment to moment under the guidance of the changing image reflected by the mirror so that the parking of the vehicle is very greatly facilitated. It will be observed that this result is secured by the use of my single mirror attachment and independently of any other mirror with which the car may be fitted. Hence the functioning of the device is entirely unaffected by any adjustment of other mirrors on the car. Furthermore, with a convexly curved mirror such as I prefer to employ drivers of different height can readily secure an adequate view of the running board and ground without the necessity of adjustment of the mirror.

It will be observed that the mirror attachment is compact, of pleasing appearance and, by reason of its mounting adjacent the very top of the window opening of the door, does not materially obstruct the window opening. And, being mounted on the door, the device of course offers no interference with the normal operation of the door. By forming the attaching portion 8ᵉ of the attachment of thin sheet metal it is possible to apply it to the top surface of the door structure without causing any interference with the door frame or jamb, there being customarily a liberal clearance between the door and its frame.

The supporting structure of the mirror, as described above, is formed so as to support the mirror with its longitudinal lines substantially parallel to the outer edge of the running board notwithstanding the forwardly converging lines of the car door, the transmission to the driver of a distorted view of the running board and adjacent ground surface being thus avoided. To permit this relation of parallelism between the mirror and running board to be secured when the attachment is applied to cars of different design the attaching part 8ᵉ is preferably formed as shown in Fig. 4 with substantial clearance between it and the upstanding portion of the rabbeted door top so that in fastening the attachment to the door its angular relation thereto can be varied to a substantial extent, according to the degree of forward convergence of the body lines of the car. It is obvious that the device can be attached to any car with very great ease and without in any way marring the exterior finish of the car.

As the entire metal structure for supporting and housing the mirror is such as can easily be stamped or formed from sheet metal, it is possible to produce the device at very moderate cost.

In the construction shown in Figs. 5 to 9, inclusive, I have shown a modified form of the attachment employing a double mirror construction which is designed to afford to the driver a field of view of larger area, particularly lengthwise of the vehicle. In this form of the attachment a type of construction is employed which is suited for original equipment purposes rather than for attachment to the vehicle by the user. The construction comprises a mirror 12 similar to the mirror 7 of the first form of construction, and a plain mirror 13 arranged at the front end of the mirror 12, the mirror 13 being of plain or flat form. The two mirrors are carried by a housing structure designated in its entirety by 14. This housing comprises a sheet metal stamping which forms the main backing wall 14ᵃ for the mirror 12 and the backing wall 14ᵇ for the mirror 13. The stamping also comprises the rear end wall 14ᶜ, the depending flange 14ᵈ which embraces the lower edge of the mirror 12, the flange 14ᵉ which embraces the edges of the plain mirror 13 and the upwardly extending flange 14ᶠ by which the attachment can be secured to the top member 15 of the vehicle door by means of suitable securing screws 16, 16. The housing further comprises a top wall member 17 which is formed with a bead 17ᵃ. The parts 17, 17ᵃ replace portions of the metal door structure which are interrupted to receive the attachment. Clips or brackets 18, 18 are secured to the housing member 17 to engage and support the upper edge of the mirror 12. As in the first form of construction the edges of the mirrors are protected by strips 19, 19 of fiber or other suitable material.

The front mirror 13 inclines downwardly and forwardly as well as downwardly and outwardly and it thus serves to reflect to the driver an image of the rearmost portions of the running board and adjacent parts of the ground, and thus supplements the view afforded by the mirror 12 which functions in the same manner as the mirror 7 of the first form of construction. In Fig. 5 the dot-and-dash lines c and d indicate the front and rear bounds of the combined fields of view afforded by the two mirrors 12 and 13 and the point e indicates the position of the driver's eye to which the lines of light converge.

It is believed that the operation and use of the modified form of the attachment will be understood without further description. It is obvious that the second form of the device has many of the advantages of the first form and in addition the advantage of an enlarged field of view afforded by the front mirror 13.

I have shown my improved attachment applied to a sedan type of vehicle but it will be understood that it is applicable to single seat vehicles equally as well as to those with multiple seats.

While the forms of construction which I have specifically illustrated and described are such as I prefer, it will be understood that they are presented for purposes of explanation and illustration and that the construction and arrangement of the attachment can be varied widely without departing from my invention as defined in the appended claims. In this connection it is to be understood that in certain broader aspects of the invention the running board of the vehicle is to be taken as typifying a principal laterally-bounding member of the vehicle whose position in relation to a street curb or other object is indicative also of the position of the vehicle as a whole.

What I claim is:

1. In a motor vehicle, the combination with the usual steering wheel, the vehicle body having, on the side remote from the steering wheel, the usual door with window laterally opposite the steering wheel, and the usual running board below said door, of a reflecting mirror attached to said door and supported in a position outside the door so as to be seen through the window opening of the door by a driver seated behind the steering wheel with his body and limbs in normal driving positions and to reflect to the eye of such driver an image of the outer edge of the running board and a portion of the ground at the side of the running board, whereby the driver can see the edge of the running board and adjacent ground surfaces while steering the vehicle and controlling the engine to park the vehicle.

2. In a motor vehicle, the combination with the usual steering wheel, the vehicle body having, on the side remote from the steering wheel, the usual door with window laterally opposite the steering wheel, and the usual running board below said door, of an attachment comprising a mirror and supporting means for the mirror secured to the top portion of said vehicle door so as to support the mirror outside the door window in a downwardly and inwardly facing position, the reflecting surface of the mirror being so formed and disposed that the intersection thereof with a vertical plane parallel to the outer edge of the running board is on a straight line parallel to said edge.

3. In a motor vehicle, the combination with the usual steering wheel, the vehicle body having, on the side remote from the steering wheel, the usual door with window laterally opposite the steering wheel, and the usual running board below said door, of an attachment comprising a mirror and supporting means for the mirror secured to the top portion of said vehicle door so as to support the mirror outside of the door window in a downwardly and inwardly facing position, the reflecting surface of the mirror being so formed and disposed that the intersection thereof with a vertical plane parallel to the outer edge of the running board is on a straight line parallel to said edge and the intersection thereof with a plane at right angles to the other plane and to the running board is on a convexly curved line.

4. In a motor vehicle, the combination with the usual steering wheel, the vehicle body having, on the side remote from the steering wheel, the usual door with window laterally opposite the steering wheel, and the usual running board below said door, of an attachment comprising a mirror and supporting means for the mirror secured to the top portion of said vehicle door so as to support the mirror outside of the door window in a downwardly and inwardly facing position, the reflecting surface of the mirror being convexly cylindrical and disposed with its axis parallel to the outer edge of the running board.

5. In a motor vehicle, the combination with the usual steering wheel, the vehicle body having, on the side remote from the steering wheel, the usual door with window laterally opposite the steering wheel, and the usual running board below said door, of an attachment comprising a mirror and means for attaching the mirror to the top portion of said door and supporting it in a downwardly and inwardly facing position outside the door window, said means comprising a part shaped to conform to the top portion of the door in a manner permitting it to be secured in different angular positions relative to the door.

6. In a motor vehicle, the combination with the usual steering wheel, the vehicle body having, on the side remote from the steering wheel, the usual door with window laterally opposite the steering wheel, and the usual running board below said door, of an attachment comprising a mirror, means for supporting the mirror in a downwardly and inwardly facing position outside the door window and comprising a sheet metal part formed to overlie and engage the top surface of the door in any one of various angular positions relative to the plane of the door, and means for securing said sheet metal part to the top of the door in any of said positions.

7. An attachment for motor vehicles having the usual door with window opposite the driver's seat and running board below the door, said attachment comprising in combination two mirrors and a unitary structure adapted to support said mirrors from the upper portion of such door outside the window thereof with one of the mirrors facing downwardly and inwardly and the other mirror in front of the first one and facing downwardly, inwardly and rearwardly.

ALLEN A. GOULD.